W. WILLIAMS.
Wheel Tire.
No. 87,229.
Patented Feb. 23, 1869.
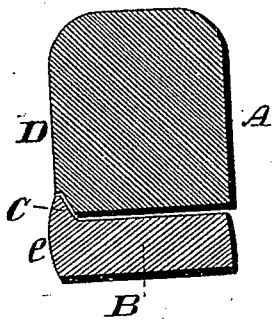

United States Patent Office.

WILLIAM WILLIAMS, OF NEW YORK, N. Y.

Letters Patent No. 87,229, dated February 23, 1869.

IMPROVED CARRIAGE-TIRE.

The Schedule referred to in these Letters Patent and making part of the same.

*To all whom it may concern:*

Be it known that I, WILLIAM WILLIAMS, of New York, in the county of New York, and State of New York, have invented a new and useful Improvement in Carriage-Tires; and I do hereby declare that the following is a full, clear, and exact description thereof, which will enable others skilled in the art to make and use the same, reference being had to the accompanying drawings, forming part of this specification.

This invention relates to a new and useful improvement in carriage-tires, whereby they are made much more useful than they have hitherto been; and It consists in providing the endless tire of a carriage-wheel with a flange, for holding the same in place after having been shrunk upon the felloes, and also for protecting and strengthening the wheel, as will be hereinafter more fully described.

The drawing represents a cross-section of the felloe and tire of a carriage-wheel, with the flange on the tire, according to my invention.

A is the felloe,
B is the tire, and
C is the flange.

It is a fact well known to all close observers, especially to carriage-makers, that the tire of a carriage-wheel always works inward on the felloe when it becomes at all loosened. Whatever the cause may be, the fact is well established, and to provide against this tendency, and to so form the edge of the tire that it will protect the felloe from abrasion and injury, and also to strengthen the wheel, is my object in this invention.

D represents the outside of the wheel. The edge of the tire, as seen at c, is rounded somewhat, and the rounded part of the edge projects outward from the felloe, so that the wood is protected thereby, as seen in the drawing.

The flange C so increases the thickness of the tire upon the outer edge, that the wheel is greatly strengthened thereby, while the tendency to work inward, when the tire is at all loose, is entirely prevented.

This tire is made whole, and put on to the wheel, when heated, in the ordinary manner, so that it is fastened, and the felloe tightly bound, by the shrinkage.

Having thus described my invention,

I claim as new, and desire to secure by Letters Patent—

The carriage-tire made in one piece, and shrunk upon the wheel, when provided with a bulge, c, upon its outer edge, and the flange C, adapted to fit into the felloes at the outer edge of the wheel, as herein described, for the purpose specified.

The above specification of my invention signed by me, this 11th day of December, 1868.

WILLIAM WILLIAMS.

Witnesses:
FRANK BLOCKLEY,
ALEX. F. ROBERTS.